June 10, 1969   E. L. SCHMITT   3,448,762
VALVE ASSEMBLY WITH INDICATOR AND LOCK
Filed Aug. 23, 1967
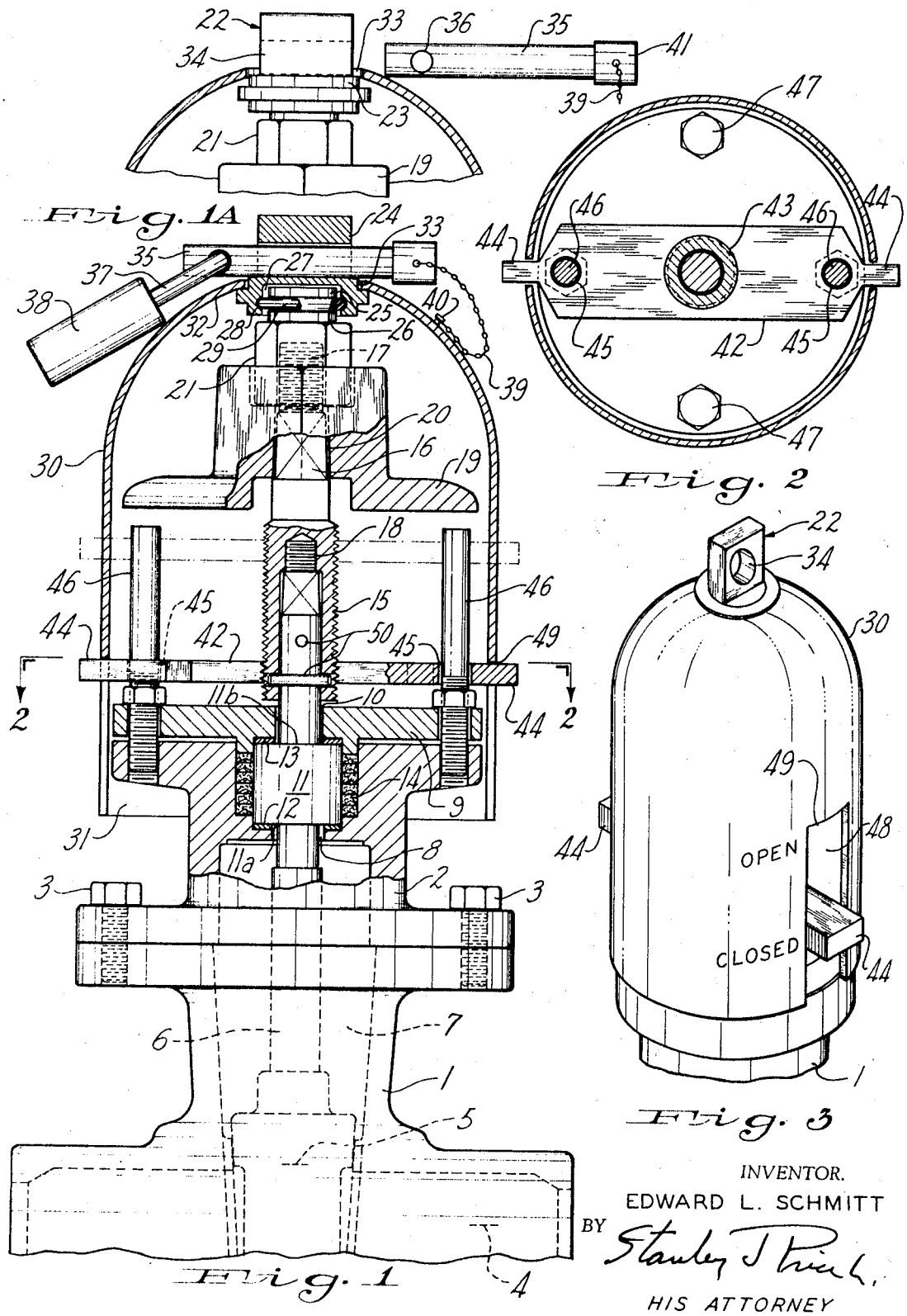
INVENTOR.
EDWARD L. SCHMITT
BY Stanley T. Price
HIS ATTORNEY

United States Patent Office 3,448,762
Patented June 10, 1969

1

3,448,762
VALVE ASSEMBLY WITH INDICATOR AND LOCK
Edward L. Schmitt, Pittsburgh, Pa., assignor to Kerostest Manufacturing Corp., Pittsburgh, Pa., a corporation of Pennsylvania
Filed Aug. 23, 1967, Ser. No. 662,727
Int. Cl. F16k 35/00, 37/00; E03b 7/07
U.S. Cl. 137—383
9 Claims

ABSTRACT OF THE DISCLOSURE

A locking valve assembly having a valve housing, a rotatable valve stem projecting out of the housing, a lock nut secured to the outermost end of the valve stem and a swivel having a transverse aperture rotatably attached to the locknut. A bell shaped valve cover overlying the stem, nut and swivel having an aperture through which a portion of the swivel passes, covering the remainder of the swivel, nut and stem, with a locking device passing through the swivel aperture to prevent cover removal An indicator showing valve position extending beyond the cover wall either through a slot therein or under the cover wall.

BACKGROUND OF THE INVENTION

Field of the invention

This invention relates to valve assemblies having a locking device and an indicator showing whether the valve is opened or closed. More specifically, this invention relates to such assemblies employed with gate type valves.

Description of the prior art

Valves are frequently placed in locations where it is essential to provide an effective lock in order to prevent unauthorized individuals from being able to operate the valve. Also, it has been known to employ locking devices where there is a high likelihood of a valve being operated through inadvertent striking with an object. Numerous effective locking devices have been previously employed. Some of these devices involve placing a suitable cap over the operating handle of the valve in order to prevent access thereto. Such caps were frequently retained in place by a padlock passed through complementary apertures of the cover and the valve body. Such a device is disclosed in U.S. Patent 2,176,399. It has also been known to provide a lock without employing a cover member. In such assemblies, a locking member is frequently secured to the operating handle of the valve and a portion of the valve body in such fashion that rotation of the valve operating handle cannot be effected with the lock member in place. As is shown in U.S. Patent 2,748,794, a padlock is employed to retain the locking member in place. It has also been known to provide valves which could be locked in either the valve open or valve closed positions, depending upon the location and the contemplated use of the valve.

Finally, it has been previously known to provide a plug type valve with a lock which could be employed to lock the valve in either the fully opened or fully closed position, with a visual indicator showing whether the valve was in the fully opened or fully closed position.

2

One of the difficulties encountered in the prior art devices with respect to locking type valves employing a cover, has been the inability of an authorized individual to obtain any indication of the valve position without opening the lock, removing the cover and inspecting the valve. As a result of a need to follow this cumbersome procedure, as a practical matter there has been no expedient means of detecting inadvertent departures from the desired valve position. Neither reliance upon the purely accidental discovery of such valve positioning errors, nor the establishment of a regular periodic inspection is a desirable solution.

In some installations, valves will be substantially always locked in the closed position. Typical of such uses are valves on by-pass lines which are opened only when a main line is placed out of service, as for repair. Prior cover type locking devices have not only not had any automatic indication of the valve position, but have also not had an effective mechanism preventing locking of the valve when the valve is in any position other than the closed position.

DISCLOSURE OF INVENTION

It is an object of this invention to provide a locking valve assembly for gate type valves having a cover adapted to be locked in position to prevent access to the valve operating handle and which assembly has an indicator giving a clear visual indication of whether the valve is opened or closed.

It is a further object of this invention to provide a locking valve assembly for gate type valves having an indicator which permits seating of the valve cover in locking position only when the indicator is in a position corresponding to the valve closed position.

It is another object of this invention to provide a locking valve assembly for gate type valves having a cover which when locked in position prevents access to the valve operating handle, wherein an indicator provides a clear visual indication of the precise valve position.

It is yet another object of this invention to provide a locking valve assembly with a valve position indicator which is adapted for use with existing valve designs, is of simple design and may be economically adopted.

Other objects and advantages of this invention will be understood from the following description of the invention, on reference to the illustrations appended hereto, in which:

FIGURE 1 is an elevational view, partly in section, illustrating a type of locking valve assembly contemplated by this invention;

FIGURE 1A is a fragmentary sectional view similar to FIGURE 1 showing the valve assembly in unlocked position;

FIGURE 2 is a sectional view taken through 2—2 of FIGURE 1; and

FIGURE 3 is a perspective view of a type of valve assembly contemplated by this invention with the indicator in the closed position.

Considering the drawings in greater detail, FIGURE 1 shows a gate type valve which has a valve housing member 1 secured to a bonnet 2 by bolts 3. The valve housing member 1 has a chamber 4. The chamber 4 is adapted to be connected at each end with the pipeline in which the valve is to be employed. There is a vertical passageway 7 in housing member 1 and bonnet 2 in which a valve element 5 is adapted to travel and assume one position closing chamber 4 and another position leaving chamber 4 fully opened or any intermediate position. The valve element 5 has an internally threaded passageway (not shown) through which passes one end of valve stem 6 which has complementary threads (not shown) and threadedly engages the valve element. The valve element 5 is restrained from rotational movement. Valve stem 6 is adapted to rotate about its own longitudinal axis, but is not capable of translational movement. As the stem 6 rotates, valve element 5 by means of the threaded engagement therewith, moves axially along the stem 6. It is apparent, therefore, that positioning of the valve element 5 is accomplished by rotating the valve stem in the desired direction and to the desired extent.

Bonnet 2, which has a centrally disposed aperture 8 through which valve stem 6 extends, is secured to gland 9, which has an aperture 10, by means of bolts 47. For convenience of reference the entire enclosure defined by the valve housing element 1, bonnets 2 and gland 9 will be referred to herein collectively as the "valve housing." Also, for convenience of illustration, gasket members which are disposed intermediate the valve housing element 1 and bonnet 2 and also intermediate bonnet 2 and packing gland 9 have not been shown.

Considering the valve stem 6 in further detail, it will be seen that it extends through both bonnet aperture 8 and gland aperture 10. The valve stem has an enlarged portion 11 which is of larger diameter than the two stem portions immediately on either side thereof. At opposed ends of portion 11 are shoulders 11a, 11b. Thrust washers 12, 13, which resist longitudinal stem movement, are provided adjacent shoulders 11a, 11b and packaging 14 is provided circumferentially over a substantial part of the enlarged portion 11. The enlarged portion 11, coupled with the adjacent cooperating packing gland 9, thrust washers 12, 13 and packing 14, provides an effective valve seal against leakage around the valve stem, which is adapted to exhibit great durability. This sealing feature which is the subject of U.S. Patent No. 3,204,970, is adapted for use in a valve employed with this invention, but does not form a part of this invention per se.

It will be appreciated that in use, the valve assembly may, depending upon a specific location and needs, assume any number of orientations and any illustrative reference herein to specific direction or orientation must be carefully selected. For purposes of convenience and clarity of description herein all references to "up" or "upwardly" will refer to the longitudinal axis of the valve stem with the direction being away from the valve housing. All reference to "down" or "downwardly" will refer to the opposite direction with reference to the longitudinal axis of the valve stem, i.e. a direction moving toward the valve housing. The use of "transverse" will refer to a direction substantially perpendicular to the longitudinal axis of the valve stem.

The valve stem 6 is secured within the valve housing and extends upwardly and outwardly therefrom. Relatively closely adjacent the point at which the valve stem emerges from gland aperture 10, the valve stem 6 has a first externally threaded portion 15. Axially upwardly of portion 15 on stem 6 is a section of rectangular cross section 16, preferably square. A second externally threaded portion 17 is disposed at the upper end of valve stem 6.

For purposes of illustration, the valve stem 6 shown in FIGURE 1 has been illustrated as being assembled from two component parts. One part consists of all of the stem within the valve housing and terminates at threaded sector 18. The second part consists of the first externally threaded sector and extends axially upwardly therefrom terminating at the second external sector 17. The second part is secured to the first part by means of threaded sector 18 and pins 50 which pass transversely through both parts. The stem has been illustrated in this fashion to represent the addition of an adaptor member (second part) to a conventional valve stem (first part) in order to illustrate the simple fashion in which a standard valve may be converted to the valve assembly of this invention. Threaded sector 18 is the portion of the conventional stem to which the nut secured on operating handle or square was threadedly attached prior to the conversion. The conversion involves simply removing the original operating handle, threading the adaptor member over the exposed stem and drilling the appropriate hole to accommodate the retaining pin 50 (or in the form illustrated, the appropriate holes to accommodate retaining pins 50).

It will be appreciated, however, that these two parts which combine to form valve stem 6 could readily be made from a single part or from more than two parts. Regardless of the manner of construction and the number of component parts, a valve stem having the structure described herein will be suitable for use with this invention. The term "valve stem" or "valve stem means" as employed herein shall mean any valve stem adapted to be rotatably secured within a valve housing and extend upwardly therefrom having a first externally disposed threaded sector adjacent the valve housing and a second externally disposed threaded sector at the upper end of the stem, regardless of whether or not the stem is a unitary member.

An operating handle or square 19 having a central opening of substantially identical shape and slightly larger size than rectangular section 16 is placed on the stem 6 with the sector 16 disposed within opening 20. Rotation of operating square 19 will create interfering engagement between it and rectangular section 16, which upon further rotation of square 19 will cause rotation of stem 6. As stem 6 rotates, the threaded end thereof within the valve housing (not shown) will turn within the internally threaded passageway of valve 5. As valve 5 is restrained against rotational movement, it will begin responsive axial movement along the valve stem 6. Rotating square 19 in one direction will create valve element axial movement in one direction and turning the square 19 in the other direction will create valve element movement in the other direction.

Securing square 19 against axial movement from valve stem 6 is locking device nut 21 which has an internally threaded cavity or recess threadedly secured to the second externally threaded sector 17 of valve stem 6. Overlying and axially aligned with the locking device nut 21 is locking device swivel 22 which has an enlarged shoulder portion 23 and a restricted portion 24 extending axially outwardly therefrom. The restricted portion 24 has a transverse opening 34. The swivel 22 is rotatably engaged with nut 21, and they are secured against relative axial separation by any convenient means. One means for preventing such axial separation, while permitting relative rotational movement is illustrated in FIGURE 1. Nut 21 is provided with an axially outwardly extending stud 25 which has an annular groove 26. Swivel 22 has an axial recess 27 adapted to receive stud 25 and an annular groove 28, within the recess, adapted to be disposed opposite groove 26. A retaining ring 29 is disposed partly in each groove 26, 28 and prevents relative axial movement of the swivel 27 and nut 21. It will, therefore, be appreciated that rotation of swivel 22 will not cause rotation of nut 21 or valve stem 6 and the valve position cannot be altered without rotation of valve stem 6.

In order to prevent access to the operating square 19 or other operating parts of the valve, a cover 30 is provided. This cover may conveniently be an elongated generally bell shaped member having an open end 31 and a closed end 32 having a relatively small aperture 33. The aperture 33 should be of such size that while restricted portion 24 of swivel 22 will extend therethrough, the shoulder portion 23 of swivel 22 will not. As is shown in FIGURES 1 when the assembly is in locking position the cover aperture 33 will have the restricted portion 24 of swivel 22 extending therethrough with transverse swivel opening 34 fully exposed. Locking may be accomplished by placing an object through opening 34 to prevent removal of cover 30. The keeper of a padlock, may, for example, be placed through opening 34 and the padlock closed. In the form of locking device selected for purposes of illustration, a locking pin 35 a diameter smaller than swivel opening 34 extends through the opening. Near one end of pin 35 is a lock receiving aperture 36 through which the keeper 37 of padlock 38 is passed. The other end of pin 35 is secured to the cover 30. As is shown in FIGURES 1 and 1A, a chain 39 may be secured to cover 30 at portion 40 and to pin 35 at position 41. It will be appreciated that access to an operating member can be obtained only by removal of cover 30 and this can be accomplished only by removing pin 35 from opening 34. Removal of pin 35 requires the removal of the lock 38 or fracture of the chain 39. While the restricted portion 24 of swivel 25 may to a certain extent be rotated while the padlock is in place, this will not result in rotation of valve stem 6.

Having now described the valve structure in operation as well as the cover and lock arrangement, the indicator, its operation and interrelationship with the valve assembly will now be considered. The indicator 42, as illustrated in the drawings, is an elongate, plate-like member having an internally threaded aperture 43 through which stem 6 extends. The valve stem 6 and indicator 42 are threadedly engaged between the threads of central aperture 43 and the first internally threaded portion 15 of stem 6. As a result of this engagement, the indicator 42 is disposed substantially transversely relative to stem 6. Extending from the indicator are arms 44. Finally, as illustrated in the drawings, the indicator 42 has two pin receiving apertures 45 disposed on opposite sides of threaded aperture 43. Secured within the valve housing and extending upwardly therefrom in parallel spaced relationship with respect to each other and with respect to valve stem 6 are a pair of indicator pins 46, which may be tubular or solid, having a diameter less than that of pin receiving apertures 45. As a further indication of the ease of adaptability of the invention to use with standard valves of this type, it is noted that pins 46 may conveniently be threadedly engaged within the housing by removal of two opposed bolts 47 and substitution of the threaded pins. Each of these pins 46 extend through an aperture 45. As the valve stem 6 is rotated in operation of the valve, the pins 46 will prevent rotation of the indicator 42, but will permit translation or vertical movement thereof, upwardly or downwardly, responsive to the direction of rotation of the valve stem 6 with which the indicator is threadedly engaged. The extent of such translational movement will be a function of the number of rotations of the valve stem 6 which in turn is directly related to the amount of movement of the valve element 5. The indicator 42 will, therefore, be at a definite position when the valve is closed, at a different definite position when the valve is open and at an intermediate position corresponding to any intermediate position assumed by the valve.

It will be appreciated that the indicator's threaded engagement with the stem 6 will provide the desired translational movement responsive to stem rotation so long as the indicator is prevented from rotating. While for purposes of illustration an indicator having two indicator pins 46 and corresponding pin receiving apertures 45 have been disclosed, it will be appreciated that other means for preventing indicator rotation may be employed. For example, one of the pins 46 in pin apertures 45 may be eliminated. The two point restraint provided by one pin 46 within one aperture 45 and the stem 6 would effectively prevent rotation and reduce the cost of manufacture of the indicator. Further cost reduction could be obtained in an indicator employing only one indicator pin, very conveniently by elimination of the second indicator arm 44 and termination of the indicator at a point adjacent the threaded orifice 43. This would reduce the material cost of the indicator by almost one half, as would any system employing the valve stem as one of two points of anti-rotational restraint. Another means for restraining the rotation of indicator 42 would be to provide a pin on each side of the indicator as a substitute for each pin 46 penetrating a pin aperture 45. Numerous other restraining means will be obvious to those skilled in the art.

It has been noted that an indicator with a single extension arm could be provided. It should be further noted that for some installations it might be desirable to have more than one indicator arm in order to provide a visible indication of valve position from several vantage points. The use of two, three or even more such arms, where desired, is contemplated within the scope of this invention.

It is necessary that the indicator arm 44 be visible when the cover 30 is locked in place. This may conveniently be accomplished by providing a slot 48 in the cover 30 which communicates with the open end 31 of the cover 30. The indicator arm 44, which is preferably of sufficient length to extend into and through the slot 48 may then be clearly viewed from the exterior of the valve assembly. As is shown in FIGURE 3, appropriate markings may be placed on the cover adjacent the slot 48 to reflect the valve position corresponding to the indicator arm position. In the form illustrated in FIGURE 3, when the indicator arm 44 is in a position adjacent the closed end 49 of the slot 48, the valve is open and when it is in the arm position shown, the valve is closed. Should markings for intermediate valve positions be desired, they may be readily provided. In the form of valve shown in FIGURE 3, the valve may be locked in the open position, the closed position, or any intermediate position.

It may be desirable for certain installations, such as by-pass installations to provide a valve assembly which can be locked only when the valve is closed. One convenient manner of obtaining this feature is to provide an abutment on the cover 30 which contacts the indicator 42 as the cover 30 is placed over the valve and moved down into locking position. The abutment should be so placed that the cover will be prevented from moving downwardly sufficiently to permit the restricted portion 24 of the swivel 22 to extend through cover aperture 33 sufficiently to fully exposed swivel opening 34 unless the indicator 42 is in the lowermost axial position of its translational path along valve stem 6, thereby corresponding with a closed valve position. One such abutment means is illustrated in FIGURE 1. Slot 48, which is disposed longitudinally within the cover, has a closed end 49 which is so disposed that it will engage indicator 42 at arm 44. As the indicator 42 is at the valve closed position, orifice 34 is sufficiently exposed to permit insertion of locking pin 35. Had the indicator been in a position axially outward along valve stem 6, as is indicated by the dotted representation of the indicator 42 in FIGURE 1, aperture 34 would have been partially or entirely obstructed by the cover, as is illustrated in FIGURE 1A, and locking could not have been effected. In lieu of a shortened slot 48, any means appropriately positioned to stop downward movement of cover 30 in relation to indicator 42 or indicator arm 44 and thereby prevent full exposure of opening 34 unless the valve is closed, could be employed. An abutment member could be mounted on the cover wall depending downwardly and adapted to contact the indicator, for example. Also, the indicator arm could terminate short of the cover wall and a flanged abutment member could be mounted on the cover wall positioned so as to contact the indicator arm and prevent further inward cover movement. Regardless of the precise form of indicator abutment structure employed, or as shown in FIGURES 1 and 1A, this embodiment of the invention provides an effective means of avoiding inadvertent locking of the valve assembly if the valve is in any position other than closed. An observer seeing the locking means in place would know that the valve was in closed position.

It will be appreciated that a cover could be provided with a number of slots with different lengths so as to provide locking only when the valve is closed if one slot or series of slots were to be employed, and to provide locking regardless of valve position if a different slot or series of slots were employed. It will be further appreciated that in lieu of providing a slot in the cover wall to receive the indicator arm, the arm could be formed so as to extend axially downwardly parallel to the cover wall and then under the wall to be visible when the unslotted cover is locked in place.

While throughout the discussion reference has been made to a gate type valve, it will be appreciated that this invention is not so limited and may be employed with any type of valve having an exposed rotating operating stem and adapted for cooperative assembly with a cover member.

This invention, therefore, provides an effective means for having a closed valve assembly locked in place while yielding an accurate visual indication of the valve position, which may be indicated to be anywhere along a range of fully open to fully closed valve position or may be such that locking can be effected only when the valve is closed. The advantages of this assembly can be obtained simply and economically. This is so as no major alterations to the valve's mode of operation are required. As a multi-piece valve stem may be employed, it will be appreciated that conventional valves of this type may be fitted with adaptors to establish the structure of this invention.

Whereas particular embodiments of the invention have been described above for purposes of illustration, it will be apparent to those skilled in the art that numerous variations of the details may be made without departing from the appended claims.

I claim:
1. A valve assembly comprising in combination,
  a valve housing,
  elongate valve stem means secured within said housing and extending upwardly therefrom,
  said valve stem means having a first externally disposed threaded portion outside of said housing and a second externally disposed threaded portion at the upper end of said valve stem means,
  indicator means having an internally threaded aperture and at least one extension arm,
  said valve stem means extending through said internally threaded aperture of said indicator means and being threadedly secured thereto along said first threaded portion,
  indicator restraining means adapted to prevent rotation of said indicator means and permitting translational movement of said indicator means responsive to rotation of said valve stem means,
  a locking device nut having an axially disposed threaded cavity,
  said second externally disposed threaded portion extending into said threaded cavity of said locking device nut and being threadedly secured therein,
  a locking device swivel having an enlarged shoulder portion and a restricted portion extending axially upwardly from said shoulder portion having a transverse opening therethrough,
  said locking device nut rotatably engaged with said locking device swivel,
  means securing said nut and said swivel against axial separation,
  a generally bell shaped cover member having an open end and a partially closed end with said partially closed end having an aperture larger than said restricted portion of said swivel and smaller than said shoulder portion of said swivel,
  said cover positioned with said restrictive portion of said locking device swivel extending through said cover aperture, and
  locking means passing through said swivel opening preventing removal of said cover.

2. The valve assembly of claim 1 including cover restraining means disposed at least in part on said cover, adapted to prevent extension of said restricted portion of said swivel through said cover aperture to fully expose said swivel opening unless said indicator means is in a position responsive to the valve stem means being at the valve closed position.

3. The valve assembly of claim 1 wherein,
  said locking device nut has an integral axially upwardly extending stud,
  said locking device swivel has an axially disposed recess,
  said upwardly extending stud rotatably positioned within said axially disposed recess, and
  said cover having at least one longitudinally disposed slot communicating with said open end and said indicator arm extending transversely through said slot.

4. The valve assembly of claim 2 wherein,
  said means preventing rotation of said indicator means consists of at least one pin receiving aperture defined within said indicator means and at least one indicator pin secured to said valve housing and extending upwardly therefrom, disposed in parallel spaced relationship with respect to said valve stem means, and each said indicator pin extending through a pin receiving aperture.

5. The valve assembly of claim 4 wherein,
  said indicator means is adapted to move upwardly along said valve stem means responsive to rotation of said valve stem means establishing valve opening,
  said indicator means is adapted to move downwardly responsive to rotation of said valve stem means establishing valve closing,
  said extension arms of said indicator means adapted to move within said slots of said cover during movement of said indicator means, and
  said cover restraining means consisting of a closed end of each slot which is adapted to engage said extension arm and prevent further downward movement of said cover.

6. The valve assembly of claim 3 wherein,
  said indicator means has two said pin receiving apertures aligned with and spaced from said internally threaded aperture and on opposed sides thereof,
  said indicator means having two extension arms aligned with and on opposed sides of said pin receiving apertures,
  said assembly has two said indicator pins, and each said indicator pin extending through one of said pin receiving apertures.

7. The valve assembly of claim 6 wherein,
  said indicator means is adapted to move upwardly along said valve stem means responsive to rotation of said valve stem means during opening of said valve,
  said indicator means adapted to move downwardly along said valve stem means responsive to rotation of said valve stem means during closing of said valve,
  said extension arms of said indicator means adapted to move within said slots of said cover during movement of said indicator means, and
  said slots being of sufficient length to permit said extension arms to be in a position responsive to the valve being open with said locking means preventing cover removal.

8. The valve assembly of claim 7 wherein,
  indicator markings are provided on said cover adjacent at least one of said slots to provide a reference standard for determining the valve position corresponding to the position of the indicator means extension arm.

9. The valve assembly of claim 7 wherein said locking means consist of an elongate locking pin of diameter smaller than said swivel aperture extending through said opening,
one end of said pin permanently secured to said cover,
a lock receiving aperture adjacent the other end of said pin, and
the keeper of a padlock passing through said lock receiving aperture.

References Cited

UNITED STATES PATENTS

| 1,229,860 | 6/1917 | Ashelman et al. | 137—556.3 XR |
| 2,176,399 | 10/1939 | Garrett | 137—368 |
| 2,748,794 | 6/1956 | Dodds | 137—385 |
| 3,272,224 | 9/1966 | Wrenshall | 137—382 |
| 3,297,050 | 1/1967 | Rider | 137—556 |

HENRY T. KLINKSIEK, *Primary Examiner.*

U.S. Cl. X.R.

137—556.3